United States Patent Office 3,040,107
Patented June 19, 1962

---

3,040,107
POLYHALOGEN-CONTAINING BICYCLIC COMPOUNDS
Paul E. Hoch, Youngstown, N.Y., assignor to Hooker Chemical Corporation, Niagara Falls, N.Y., a corporation of New York
No Drawing. Filed Dec. 19, 1958, Ser. No. 781,457
3 Claims. (Cl. 260—648)

This invention relates to new polyhalogen-containing bicyclic compounds. More particularly this invention relates to two new compositions of matter which are stereoisomers and to the process for preparing them.

The stereoisomers of the present invention are prepared by different routes. One of the compounds may be prepared by the catalytic hydrogenation of 1,4,5,6,7,7-hexachloro - 2,3 - dimethylenebicyclo-(2.2.1)-heptene-5, hereinafter called HET diene (HET is a registered trademark of Hooker Chemical Corporation). The catalytic hydrogenation of HET diene may be shown as follows:

I

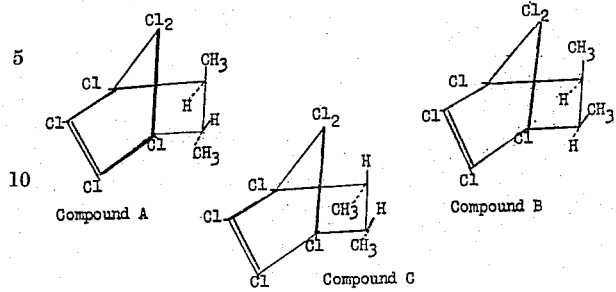

HET diene is disclosed and claimed in copending application S.N. 757,187, filed August 26, 1958; and may be prepared by the dehydrohalogenation of 1,4,5,6,7,7-hexachloro - 2,3 - dichloromethylbicyclo - (2.2.1)-heptene-5, hereinafter called HET dichloride. In the preferred procedure HET dichloride is heated in an alcoholic solution of an alkali hydroxide at a temperature between about 20 and 100 degrees centigrade. HET dichloride may be prepared in high yields by the Diels-Alder adduction of hexachlorocyclopentadiene as the diene and cis-1,4-dichlorobutene-2 as the dienophile.

The other stereoisomer may be prepared by the Diels-Alder adduction of hexachlorocyclopentadiene as the diene and cis-butene-2 as the dienophile. This reaction may be shown as follows:

II

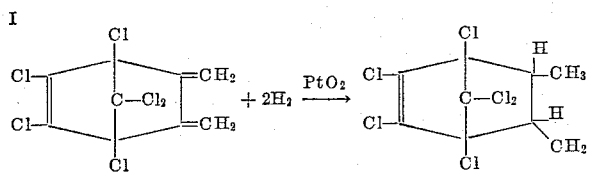

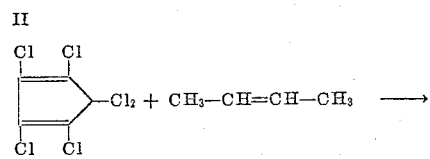

In accordance with the present invention it is surprising to find that the product which results from reaction I above differs from the product which results from reaction II above since we would expect that the same product result from both reactions. Because of steric reasons, we could predict that the hydrogenation product of HET diene give the exo-cis configuration and hence the name 1,4,5,6,7,7 - hexachloro-exo-cis-2,3-dimethylbicyclo-(2.2.1)-heptene-5. The product obtained from the Diels-Alder adduction of hexachlorocyclopentadiene and butene-2 may, therefore, be either (1) the trans configuration or (2) the endo-cis configuration. The steric configurations are shown below wherein Compound A represents the trans configuration, Compound B represents the exo-cis configuration, and Compound C represents the endo-cis configuration.

I would assume that the product from the Diels-Alder adduction has the endo-cis configuration due to the fact that in hexachlorocyclopentadiene Diels-Alder reactions, the cis configuration is preferred. The name of the compound would be 1,4,5,6,7,7-hexachloro-endo-cis-2,3-dimethylbicycle(2.2.1)-heptene-5.

I have presented the steric configurations possible for the products of the present invention and have indicated that it is my belief that the exo-cis configuration results from the hydrogenation of HET diene and the endo-cis configuration results from the Diels-Alder adduction. These theories are offered herewith so that the specification may be scientifically complete and are not to be construed as being the basis for the present invention.

In the hydrogenation of HET diene, a solvent should be employed. The solvent which is employed should be inert with respect to the reactants and the reaction products and have a sufficiently high boiling point to allow for reaction at elevated temperatures without necessitating the application of superatmospheric pressure. Ethanol and methanol are the preferred solvents; however, the others which may be employed include, for example, dioxane, n-butanol, butyl Cellosolve, methyl Cellosolve, diethyl carbitol, tertiary butyl alcohol, normal amyl alcohol and tertiary amyl alcohol. Any standard hydrogenation procedure may be employed. In the hydrogenation any reducing catalyst which is commonly employed for low pressure hydrogenation may be used, but the preferred hydrogenation catalysts are platinum oxide or palladium oxide. The time of the hydrogenation reaction should be continued until the proper amount of hydrogen is absorbed, i.e. about 2 mol equivalents.

The product may then be separated by any procedure known in the art; for example, the catalyst and solvent may be removed by filtration and distillation respectively and the product distilled off.

In the Diels-Alder adduction of hexachlorocyclopentadiene and butene-2, it is preferred to employ equimolar proportions; however, an excess of either reactant may be used. The preferred commercial procedure for preparing the Diels-Alder adduct would be to run the reaction in an autoclave; however, for simplicity in the laboratory, a large excess of butene-2 may be passed into the hot stirred hexachlorocyclopentadiene. The preferred temperature of reaction will vary between 130 and 200 degrees centigrade. The time of reaction and the rate of passing butene-2 into the hexachlorocyclopentadiene is unimportant in the laboratory procedure. In the commercial operation the preferred time of reaction will vary between 4 and 16 hours. The products may then be separated by any procedure known to the art, for example, stripping off unreacted reagents and distilling off the product.

The products of the present invention find utility as insecticide, fungicide and miticide. The products of the present invention also find utility as flameproofing agents. The products of the present invention also find utility as chemical intermediates.

Example 1

A 500 cubic centimeter pressure bottle was charged with 32.5 grams of HET diene, 150 cubic centimeters of ethanol, and 0.1 gram of platinum oxide. The pressure bottle was then placed in a shaker and after removal of the air present, the solution was subjected to hydrogenation to 15–20 pounds per square inch hydrogen. The hydrogenation was continued until 8 pounds of hydrogen was absorbed (2 mol equivalent) and hydrogenation stopped. The contents of the flask were filtered and after removal of the alcoholic solvent, a solid product was recovered. The product was recrystallized from methanol and had a melting point of 91 to 93 degrees centigrade, empirical formula of $C_9H_8Cl_6$, and a chlorine analysis of 64.7 percent calculated; 65.0 percent found.

Example 2

A 500 cubic centimeter flask was charged with 273 grams of hexachlorocyclopentadiene and warmed with stirring to 160 to 170 degrees centigrade. Into this liquid was passed gaseous butene-2 for about 20 hours. The unreacted hexachlorocyclopentadiene was removed by distillation. The solid residue was recrystallized by methanol. The product thereby obtained had a melting point of 200 to 202 degrees centigrade, an empirical formula of $C_9H_8Cl_6$ and a chlorine analysis of 64.7 percent calculated; 65.0 percent found.

Example 3

Five grams of the product obtained in Example 1 were dissolved in 10 grams of a copolymerizable composition consisting of 44 percent styrene, and 56 percent of a polyester consisting of 1 mol of phthalic anhydride, 1 mol of fumaric acid and 2 mols of ethylene glycol. One percent of benzene peroxide was added as a polymerization catalyst. The resulting mixture was placed in a circulating oven at 80 degrees centigrade for about 18 hours. A clear resin was obtained which was self-extinguishing when ignited.

Example 4

Example 3 was repeated except 5 grams of the product obtained in Example 2 were employed. The clear resin thereby obtained was self-extinguishing when ignited.

It is to be understood that the invention is not limited to the specific examples which have been offered merely as illustrative, and that modifications may be made within the scope of the appended claims without departing from the spirit of the invention.

I claim:
1. The process which comprises subjecting 1,4,5,6,7,7-hexachloro-2,3-dimethylenebicyclo-(2.2.1)-heptene-5 to catalytic hydrogenation in the presence of an inert solvent having a sufficiently high boiling point to allow for reaction at elevated temperatures without necessitating the application of superatmospheric pressure and recovering 1,4,5,6,7,7 - hexachloroexo-cis-2,3-dimethylbicyclo-(2.2.1)-heptene-5 as a product of the process.

2. The process which comprises subjecting 1,4,5,6,7,7-hexachloro-2,3-dimethylenebicyclo - (2.2.1)-heptene-5 to hydrogenation in the presence of an inert solvent selected from the group consisting of ethanol, methanol, dioxane, n-butanol, butyl Cellosolve, methyl Cellosolve, diethyl carbitol, tertiary butyl alcohol, normal amyl alcohol, and tertiary amyl alcohol, and a catalyst selected from the group consisting of platinum oxide and palladium oxide, said hydrogenation being conducted at substantially atmospheric pressure, and recovering 1,4,5,6,7,7 - hexachloroexo-cis-2,3-dimethylbicyclo-(2.2.1)-heptene-5 as a product of the process.

3. The process which comprises subjecting 1,4,5,6,7,7-hexachloro-2,3-dimethylenebicyclo-(2.2.1) - heptene - 5 to hydrogenation in the presence of ethanol and platinum oxide at substantially atmospheric pressure and recovering 1,4,5,6,7,7 - hexachloroexo-cis-2,3-dimethylbicyclo-(2.2.1)-heptene-5 as a product of the process.

References Cited in the file of this patent

UNITED STATES PATENTS

| | | |
|---|---|---|
| 1,879,767 | Schoeller et al. | Sept. 27, 1932 |
| 2,881,223 | Schmerling | Apr. 7, 1959 |

FOREIGN PATENTS

| | | |
|---|---|---|
| 80,063 | Netherlands | July 15, 1955 |

OTHER REFERENCES

Berger et al.: "Ziet. fur Naturforschung," vol. 9b. p. 684 (1954).